United States Patent
Tobinai

(10) Patent No.: US 6,928,996 B2
(45) Date of Patent: Aug. 16, 2005

(54) STRATIFIED SCAVENGING MECHANISM OF A TWO-STROKE ENGINE

(75) Inventor: Teruhiko Tobinai, Miyagi-ken (JP)

(73) Assignee: Walbro Japan, Inc., Tokyo (JP)

( * ) Notice: Subject to any disclaimer, the term of this patent is extended or adjusted under 35 U.S.C. 154(b) by 0 days.

(21) Appl. No.: 10/606,596

(22) Filed: Jun. 26, 2003

(65) Prior Publication Data

US 2004/0050376 A1 Mar. 18, 2004

(30) Foreign Application Priority Data

| Jul. 3, 2002 | (JP) | 2002-194986 |
| Oct. 25, 2002 | (JP) | 2002-311358 |

(51) Int. Cl.[7] .............................................. F02M 23/03
(52) U.S. Cl. .......................................... 123/586; 261/35
(58) Field of Search ............................... 123/586, 73 A, 123/73 PP, 73 B, 73 CB, 336; 261/35, 23.3

(56) References Cited

U.S. PATENT DOCUMENTS

| 11,081 | A | 6/1854 | Perkes |
| 4,060,062 | A | 11/1977 | Tsutsui et al. |
| 4,075,985 | A | 2/1978 | Iwai |
| 6,112,708 | A | 9/2000 | Sawada et al. |
| 6,135,072 | A | 10/2000 | Kishita |
| 6,216,650 | B1 | 4/2001 | Noguchi |
| 6,257,179 | B1 | 7/2001 | Uenoyama et al. |
| 6,298,811 | B1 | 10/2001 | Sawada et al. |
| 6,328,288 | B1 | 12/2001 | Gerhardy |
| 6,347,787 | B1 | 2/2002 | Tobinai et al. |
| 6,349,925 | B1 | 2/2002 | Tobinai et al. |
| 6,354,251 | B1 | 3/2002 | Toda |
| 6,418,891 | B2 * | 7/2002 | Kobayashi .............. 123/73 PP |
| 6,450,135 | B1 | 9/2002 | Araki |
| 6,591,794 | B2 | 7/2003 | Toda |
| 6,708,958 | B1 | 3/2004 | Warfel et al. |
| 6,749,180 | B2 | 6/2004 | Durr |
| 2002/0043227 | A1 | 4/2002 | Carlsson et al. |

FOREIGN PATENT DOCUMENTS

| EP | 1041267 | 10/2000 |
| EP | 1134380 | 9/2001 |
| JP | 585424 | 1/1983 |
| JP | 9125966 | 5/1997 |
| JP | 9268917 | 10/1997 |
| JP | 9287521 | 11/1997 |
| JP | 186559 | 4/2000 |
| JP | 00186560 | 7/2000 |

* cited by examiner

Primary Examiner—Henry C. Yuen
Assistant Examiner—Hyder Ali
(74) Attorney, Agent, or Firm—Reising, Ethington, Barnes, Kisselle, P.C.

(57) ABSTRACT

A stratified scavenging mechanism of a two-stroke internal combustion engine including a carburetor for supplying and controlling an air and fuel mixture to the engine, an air intake passage in which a throttle valve is disposed, an air passage provided on a scavenging air supply body, an air control valve disposed in the air passage for opening and closing the air passage, and an air valve lever operably connected to a throttle valve lever. The scavenging air supply body is carried by the carburetor. More than one air passage may be provided, and a separate air control valve is preferably provided for each air passage.

12 Claims, 2 Drawing Sheets

STRATIFIED SCAVENGING MECHANISM OF A TWO-STROKE ENGINE

REFERENCE TO RELATED APPLICATION

Applicant claims priority of Japanese patent applications, Ser. Nos. JP 2002-194,986, filed Jul. 3, 2002 and JP 2002-311,358, filed Oct. 25, 2002.

1. Field of the Invention

This present invention relates to a stratified scavenging mechanism of a two-stroke internal combustion engine, and particularly to a stratified scavenging mechanism of a two-stroke internal combustion engine utilizing a carburetor having an air passage communicating with the engine.

2. Background of the Invention

In order to prevent fuel from flowing out of an engine cylinder exhaust port at the time of scavenging in a stratified scavenging two-stroke internal combustion engine, a stratified scavenging mechanism has been known in which an air passage is provided separately from an air and fuel mixture passage. This provides air, and an air and fuel mixture in a stratified fashion in a crankcase chamber of the engine. Scavenging is done with the air stratification in the beginning of the scavenging cycle, and then scavenging and suction are done with the air and fuel mixture stratification.

Stratified scavenging mechanisms of this kind have been known to include a configuration in which an air control valve or an air control mechanism is arranged on the side of an insulator pipe (Japanese Patent Laid-Open No. 2000-186559), a configuration in which an air control valve or air control mechanism is integrated with a carburetor body (Japanese Patent Laid-Open No. 2000-282874), and a configuration in which an air control valve or an air control mechanism is held by a carburetor on the side of an air cleaner (Japanese Patent Laid-Open No. 8-106186).

SUMMARY OF THE INVENTION

A stratified scavenging mechanism of a two-stroke internal combustion engine including a carburetor for supplying and controlling an air and fuel mixture to the engine, an air intake passage in which a throttle valve is disposed, an air passage provided on a scavenging air supply body, an air control valve disposed in the air passage for opening and closing the air passage, and an air valve lever operably connected to a throttle valve lever. The scavenging air supply body is carried by the carburetor. More than one air passage may be provided, and a separate air control valve is preferably provided for each air passage.

Further, in one embodiment, the passage member is integrated with the carburetor, and the throttle valve and air control valve are operably connected after the air control valve is assembled. In one embodiment, a passage member for supporting an air control valve is formed separately from a pump cover plate of a carburetor, and the passage member is secured to the pump cover plate such as by bolts. The passage member may be molded integral with the pump cover plate which is secured to the carburetor body such as by bolts.

That is, the passage member is secured, in advance, to the pump cover plate, or the pump cover plate and integral passage member are secured to the carburetor body. Then, for example, an air cleaner, the carburetor body and an insulator pipe are placed face to face and connected to the engine by a pair of mounting bolts. An outlet of the passage member is connected to a scavenging port of the engine by an air pipe, and an inlet of the passage member is connected to the air cleaner. This facilitates assembling the passage member having an air control valve to the carburetor body, and mounting the passage member to the engine.

A throttle valve lever of the carburetor and an air control valve lever of the passage member are operably connected by a link, preferably providing a lost motion coupling. In one form, a connecting portion between one of the levers and the link is provided with a slot so that rotation of the air control valve lever is delayed with respect to the rotation of the throttle valve lever when the throttle valve is rotated away from its idle position.

Some potential objects, features and advantages of this invention include providing an improved scavenging arrangement for an engine that provides an improved and adjustable scavenging air supply to an engine, provides an increased supply of air to an engine, provides a passage member for scavenging air that is integrated with a carburetor, is compact, and is of relatively simple design and economical manufacture and assembly.

BRIEF DESCRIPTION OF THE DRAWINGS

These and other objects, features and advantages of the present invention will be apparent from the following detailed description of the preferred embodiments, appended claims and accompanying drawings in which:

DETAILED DESCRIPTION OF THE PREFERRED EMBODIMENTS

First Embodiment

Figure 1:
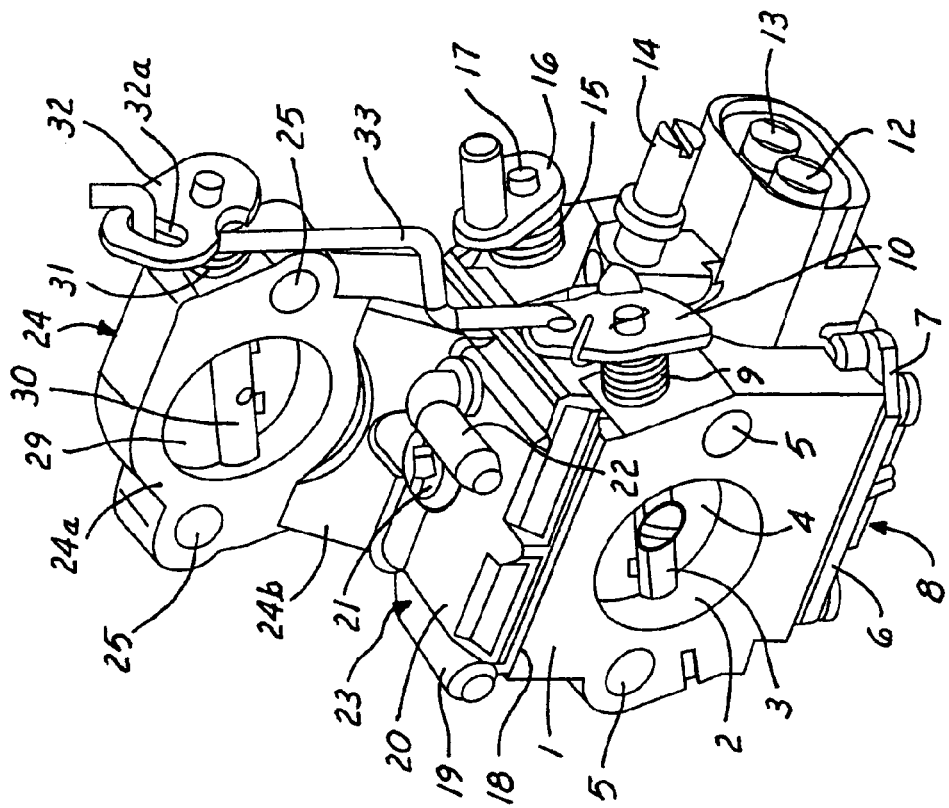
FIG. 1 is a perspective view of one presently preferred embodiment of a carburetor provided with a stratified scavenging mechanism for a two-stroke internal combustion engine.

As shown in FIG. 1, a carburetor has a butterfly type throttle valve 4 supported by a throttle valve shaft 3 on the outlet side of an air intake passage 2 extending through a carburetor body 1 in a longitudinal direction. A butterfly type choke valve (not shown) is supported by a choke valve shaft 17 on the inlet side of the air intake passage 2. A return spring 9 is wound about an outer end portion of the throttle valve shaft 3, and a throttle valve lever 10 is connected thereto. The return spring 9 is connected at one end to the carburetor body 1 and at its other end to the throttle valve lever 10, to yieldably bias the throttle valve 4 toward its idle position, shown in FIG. 1. In this position, the throttle valve lever 10 is placed in contact with a conical cam surface of an idle stop bolt 14 threadedly supported on the side wall portion of the carburetor body 1. The idle position of the throttle valve lever 10 is adjusted by loosening or tightening the idle stop bolt 14. A spring 15 is wound about the outer end portion of the choke valve shaft 17 which is substantially parallel with the throttle valve shaft 3, and a lever 16 is connected thereto. The choke valve is yieldably biased to a fully open position by the force of the spring 15. A low speed fuel adjustment needle valve 12 and a high speed fuel adjustment needle valve 13, which are described later, are provided on a side wall of the carburetor body 1.

A pump cover plate 20 is connected by a bolt 21 to an upper surface of the carburetor body 1 through a diaphragm 18 of a fuel pump 23. On one side of the diaphragm 18 a pulsation pressure chamber is defined into which a pulsating pressure signal from a crankcase chamber of the two-stroke engine is introduced via a pipe 22. On the other side of the diaphragm 18 a pump chamber is defined and fuel from a fuel tank, not shown, is taken into the pump chamber via a fuel pipe 19 as the diaphragm 18 vibrates up and down. Fuel is discharged from the pump chamber to a fuel metering chamber of a constant pressure fuel supply mechanism 8 connected to a lower wall of the carburetor body 1. The constant pressure fuel supply mechanism 8 has a lower plate 7 connected to the lower end of the carburetor body 1 through a diaphragm 6, and a fuel metering chamber and an atmospheric chamber are defined on the opposed sides of the diaphragm. Although not shown, the fuel metering chamber is provided with a lever mechanism which is displaced in response to a vertical displacement of the diaphragm 6, an inlet valve is opened and closed by the lever mechanism, and fuel from the fuel pump 23 is supplied to the fuel metering chamber via the inlet valve.

Fuel in the fuel metering chamber is supplied to the air intake passage 2 via the low speed fuel adjustment needle valve 12 and a low speed fuel orifice open to the air intake passage 2 near a closed position of the throttle valve 4. Further, fuel in the fuel metering chamber is supplied to the air intake passage 2 via the high speed fuel adjustment needle valve 13 and a high speed fuel orifice preferably disposed in a venturi portion of the air intake passage 2 between the throttle valve 4 and the choke valve.

A passage member or scavenging air supply body 24 for introducing air to an exhaust port of the engine prior to a fuel and air mixture to a scavenging port during the downward movement of a piston of the two-stage engine, is mounted on the pump cover plate 20. The passage member 24 includes a vertical wall 24a having an opening 26 between a pair of apertures 25, and a base plate 28 adjacent to the pump cover plate 20. A plurality of reinforcing ribs 27 are disposed between the vertical wall 24a and the base plate 28. The vertical wall 24a, base plate 28 and ribs 27 are preferably integrally formed and can be formed of any suitable material including metals, such as an aluminum alloy or the like, or polymers or plastics.

The base plate 28 is secured to the pump cover plate 20 and secured, such as by a bolt 21. In the illustrated embodiment, for example, a locating pin projection downward form the base plate 28 is disposed in a complementary hole of the pump cover plate 20 to locate the base plate 28 in a prescribed position on the carburetor. A butterfly type air control valve 29 is supported in the opening 26 by a valve shaft 30, a return spring 31 is wound about one end of the valve shaft 30 and an air valve lever 32 is connected thereto. The return spring 31 is connected at one end to the vertical wall 24a and at its other end to the air valve lever 32, to yieldably bias the air control valve 29 to a closed position at least substantially blocking or closing the opening 26. A slot 32a is provided in the air valve lever 32. The air control valve 29 moves between a first, generally closed position restricting air flow in the air passage and a second, filly open position permitting a substantially unrestricted flow through the air passage.

The air valve lever 32 and the throttle valve lever 10 are operably connected by a link 33. One end of the link 33 is connected to the throttle valve lever 10 so as to be free from play, and the other end of the link 33 is received in the slot 32a of the air valve lever 32. The slot 32a provides a lost motion coupling between the throttle valve 4 and the air control valve 29. That is, when the throttle valve 4 is in its idle position, the end of the link 33 engages one edge of the slot 32a, and when the throttle valve 4 is moved away from its idle position the link initially moves within the slot without moving the air valve lever 32 so that the air control valve 29 is not moved from its first position. When the throttle valve 4 is opened a predetermined amount from idle, the link 33 comes in contact with an opposite edge of the slot 32a, so that further opening of the throttle valve 4 causes a corresponding movement of the air control valve 29 via movement of its lever 32 toward its second position. Alternately, the slot 32a may be provided on the throttle valve lever 10 and the link may be slidably received in the slot to likewise provide a lost motion coupling between the throttle valve lever 10 and air valve lever 32.

The vertical wall 24a of the passage member 24 has a thickness sufficient to support the air control valve 29. One end flange of an air pipe, preferably made of synthetic resin or an aluminum alloy or the like, is placed on and connected to the front surface of the vertical wall 24a, and the other end flange of the air pipe is connected to a scavenging port of the engine. The rear surface of the vertical wall 24a is connected to the air cleaner. The air cleaner and the heat insulator pipe are faced to the rear surface and the front surface, respectively, of the carburetor body 1, and are connected to the suction port of the engine by through bolts extending thorough a pair of apertures 5 in the carburetor body 1.

In the present invention, the passage member 24 is secured to the carburetor body 1, and an air pipe different in length from the insulator pipe is connected between the passage member 24 and the scavenging port of the engine. Therefore, if the air cleaner, the carburetor body 1 and the insulator pipe are placed face to face and secured to the suction port of the engine, and then the air pipe is connected between the passage member 24 and the scavenging port of the engine, the mounting and assembly operation can be relatively easily performed. This is particularly true if a flexible air pipe is used, and, for example, even if the vertical spacing between the suction port and the scavenging port is somewhat different from the vertical spacing between the air intake passage 2 and the opening 26, the mounting and assembly operation can be easily performed.

In the illustrated embodiment, the vertical wall 24a of the passage member 24 is disposed generally at the rear of the carburetor body 1, but it may be disposed at the front of the carburetor body 1 (to the engine side).

Second Embodiment

Figure 2:
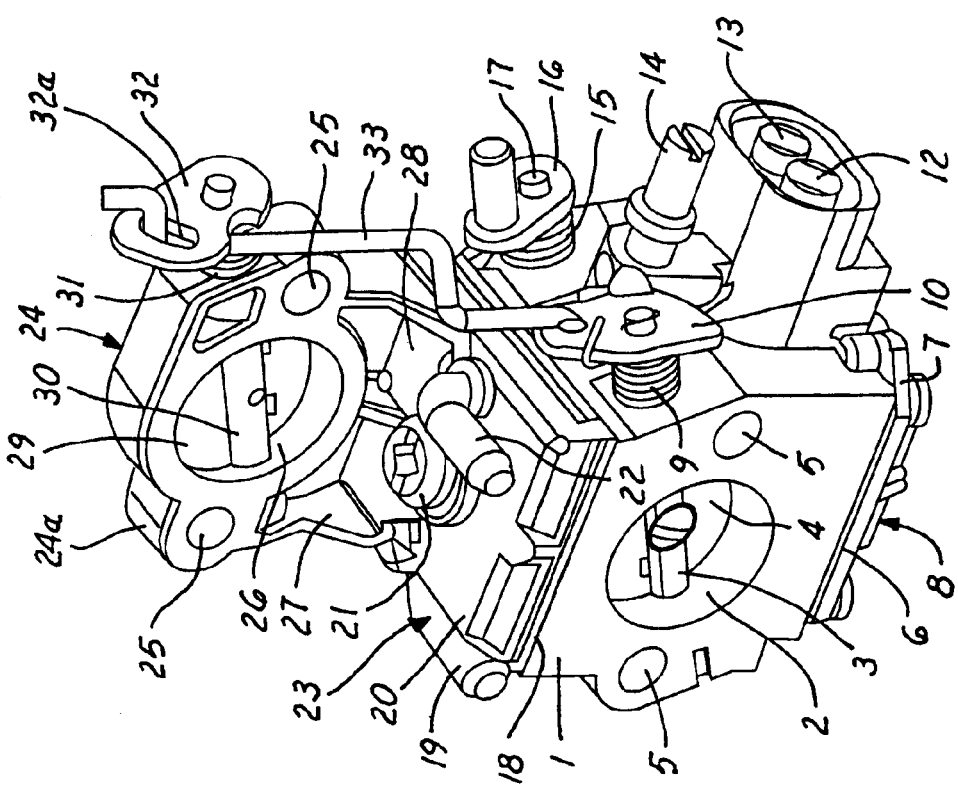
FIG. 2 is a perspective view of another embodiment of a carburetor provided with a stratified scavenging mechanism for a two-stroke internal combustion engine.

In the embodiment shown in FIG. 2, the pump cover plate 20 and the vertical wall 24a of the passage member 24 are integrally formed as one piece and are then connected, such as by the bolt 21, to the carburetor body 1. The connecting portion of the passage member 24 between the pump cover plate 20 and the vertical wall 24a is strengthened by an inclined wall 24b. Otherwise, this second embodiment carburetor may be the same as the first embodiment carburetor.

Third Embodiment

Figure 3:
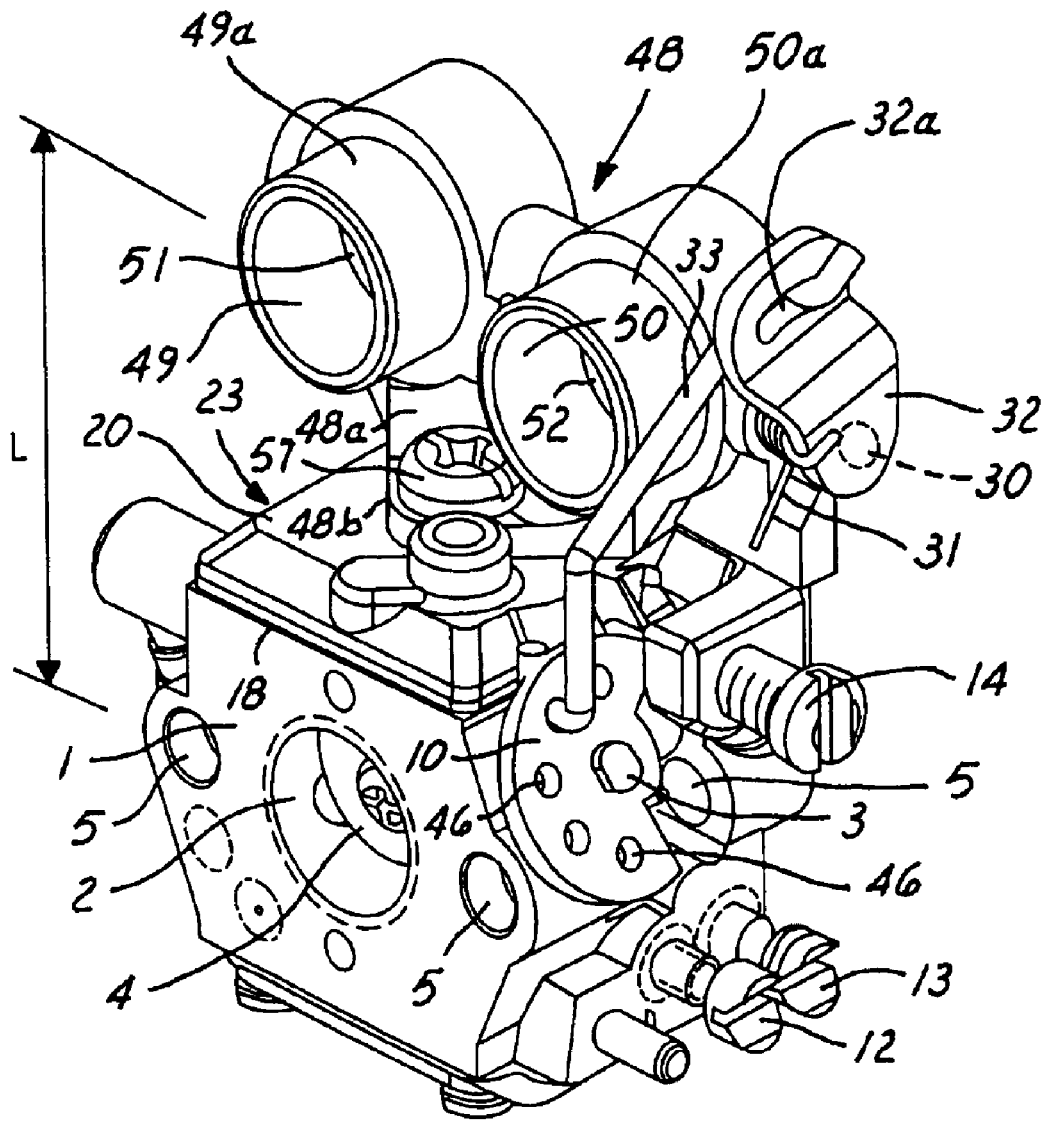
FIG. 3 is a perspective view of still another embodiment of a carburetor provided with a stratified scavenging mechanism for a two-stroke internal combustion engine.

As shown in FIG. 3, a carburetor provided with the stratified scavenging mechanism is configured such that a butterfly type throttle valve 4 is supported by an inclined throttle valve shaft 3 on the outlet side of an air intake passage 2 extending through a carburetor body 1 in a longitudinal direction, and a butterfly type choke valve (not shown) is supported by a choke valve shaft, if desired, on the inlet side of the air intake passage 2. A return spring is wound about an outer end portion of the valve shaft 3, and a throttle valve lever 10 is connected thereto. The throttle valve 4 is yieldably biased to its idle position, as shown in FIG. 3, by the force of the return spring. In this position, the throttle valve lever 10 is placed in contact with a conical surface of an idle stop bolt 14 threadedly supported on the side wall of the carburetor body 1. When the idle stop bolt 14 is loosened or tightened, the idle position of the throttle valve lever 10 is adjusted. A low speed fuel adjustment needle valve 12 and a high speed fuel adjustment needle valve 13 are provided on a side wall portion of the carburetor body 1. A pump cover plate 20 is connected on the upper end of the carburetor body 1 by a bolt 57.

According to the present invention, mounted on the pump cover plate 20 is a passage member or scavenging air supply body 48 for introducing air to an exhaust port prior to a fuel and air mixture to a scavenging port during downward movement of a piston of the two-stroke engine. In the scavenging air supply body 48, a plurality of tubes is provided each defining an air passage therethrough. As shown in FIG. 3, two tubes 49*a* and 50*a* are provided and are each preferably integrally molded with the body 48 of synthetic resin, an aluminum alloy or the like.

Butterfly type air valves 51 and 52 are supported on the tubes 49*a* and 50*a* by a valve shaft 30 extending across the air passages 49 and 50 so that they move in unison. A return spring 31 is wound about one end of the valve shaft 30, and the air valve lever 32 is connected thereto. The return spring 31 is connected at one end to the wall portion and at its other end to the air valve lever 32 to yieldably bias the air valves 51 and 52 to a closed position. The air valve lever 32 is preferably formed with a slot 32*a*.

The air valve lever 32 and the throttle valve lever 10 are operably connected by a link 33. One end of the link 33 is connected, preferably free from play, to one of a plurality of holes 46 spaced generally about the periphery of the throttle valve lever 10, and the other end of the link 33 is received in the slot 32*a* of the air valve lever 32. The length of the slot 32*a* is determined to provide a predetermined lost motion coupling between the valve levers 10 and 32. That is, when the throttle valve 4 is in its idle position, the end of the link 33 is engaged with one end of the slot 32*a*, and when the throttle valve 4 is moved from idle, the link 33 initially moves within the slot 32*a* without moving the air valve lever 32. When the throttle valve is moved a predetermined amount form its idle position, the link 33 engages the other end of the slot 32*a* such that further movement of the throttle valve causes a corresponding movement of the air valves 51, 52 away from their closed positions. Alternatively, the slot 32*a* may be provided in the end of the throttle valve lever 10 instead of the air valve lever 32.

The scavenging air supply body 48, shown in FIG. 3, has a plate thickness sufficient for the connecting portion 48*a* to connect the tubes 49*a* and 50*a* and the base plate 48*b*. The base plate 48*b* is formed integral with the lower end of the connecting portion 48*a* and is put on the pump cover plate 20 and fastened to the carburetor body 1 by a bolt 57. An air pipe having a connecting part formed from a synthetic resin pipe is externally fitted over the tubes 49*a* and 50*a* and is communicated with a scavenging port of the engine. The upstream end of the tubes 49*a* and 50*a* is connected to an air cleaner. The air cleaner faces the back surface of the carburetor body 1, as shown in FIG. 3, and an insulator pipe faces the front surface of the carburetor body 1, and is connected to the wall surrounding the intake port of the engine by a pair of through-bolts extending through corresponding mounting holes 5.

The scavenging air supply body 48 is integrated with the carburetor body 1, and an air pipe different in length from the aforementioned insulator pipe is connected between the scavenging air supply body 48 and the scavenging port of the engine. Therefore, assembly and mounting of the carburetor on the engine is easy when the air cleaner, the carburetor body 1 and the insulator pipe are placed face to face and secured to the intake port of the engine, and then the air pipe is connected between the scavenging air supply body 48 and the scavenging port of the engine. Desirably, if a flexible air pipe is used, the mounting and assembly operation is easy even if a vertical spacing between the intake port and the scavenging port is somewhat different form a vertical spacing "L" between the air intake passage 2 and the tubes 49*a* and 50*a*.

There is provided a play in the link for interlocking and connecting the throttle valve lever and the air control valve lever to avoid delivering a lean fuel and air mixture to the engine at the time of starting the engine and during idle operation to stabilize the engine. In the present invention, where a large quantity of scavenging air is necessary, a plurality of air passages may be provided so that the diameter of each air passage can be made small, and therefore, the spacing "L" between the center of the air intake passage of the carburetor and the center of the air passages is small. This enables making the entire carburetor and scavenging air body unit small, and when the carburetor is mounted on the engine, screw-mounting between the air passages can be achieved, improved the mounting properties.

In typical engines a plurality of scavenging ports are provided. Where scavenging air is supplied from a single air passage to the plurality of scavenging ports, the scavenging air passage becomes complex to ensure proper distribution of the scavenging air. Whereas if the scavenging air is supplied from a plurality of air passages to the scavenging ports, the scavenging passages of the engine can be simplified, and also the suction resistance of the scavenging air can be reduced.

What is claimed is:

1. An apparatus for delivering a fuel and air mixture and air to an engine, comprising:

a carburetor having a body, an air intake passage formed in the body through which a fuel and air mixture is delivered to the engine, a throttle valve carried by the body for movement between idle and wide open positions to control fluid flow through the air intake passage, a first side of the body on one side of the air intake passage and a second side of the body on another side of the air intake passage and generally opposite the first side, a fuel metering chamber carried by the body on the first side of the body for supplying fuel to the air intake passage and a fuel pump carried by the body on the second side of the body for delivering fuel to the fuel metering chamber;

a separate air supply body carried by the carburetor body, mounted on the second side of the carburetor body and having at least one air passage through which air is delivered to the engine, and at least one air control valve carried by the air supply body for movement between a first closed position and a second fully open position to control the flow of air through said at least one air passage; and the air control valve is operably connected to the throttle valve so that said at least one air control valve is moved between its first and second positions in response to at least a portion of the movement of the throttle valve between its idle and wide open positions.

2. The apparatus of claim 1 wherein the air control valve and the throttle valve are operably connected together by a link that provides a lost motion coupling permitting limited movement of throttle valve relative to the air control valve.

3. The apparatus of claim 2 wherein the link permits the throttle valve to rotate a predetermined amount away from its idle position without causing movement of the air control valve from its first closed position.

4. The apparatus of claim 2 which also comprises a throttle valve lever connected to the throttle valve and an air valve lever connected to the air control valve, the link being operably connected to the throttle valve lever at one end and to the air valve lever at its other end, and wherein one of the throttle valve lever and air valve lever includes a slot in which a portion of the link is slidably received to provide the lost motion coupling.

5. The apparatus of claim 1 which also comprises a plate carried by the carburetor body, and wherein the air supply body is connected to the plate.

6. The apparatus of claim 5 wherein the plate and air supply body are integrally formed in one piece.

7. An apparatus for delivering a fuel and air mixture and air to an engine, comprising:
  a carburetor having a body, an air intake passage formed in the body through which a fuel and air mixture is delivered to the engine, and a throttle valve carried by the body for movement between idle and wide open positions to control fluid flow through the air intake passage; and
  a passage member carried by the carburetor body and having a plurality of air passages in the passage member through which air is delivered to the engine, and a separate air control valve associated with each air passage for movement between first and second positions to control the flow of air through the associated air passage, each air control valve being operably connected to the throttle valve so that each air control valve is moved between its first and second positions in response to at least a portion of the movement of the throttle valve between its idle and wide open positions.

8. The apparatus of claim 7 which also comprises a shaft on which the air control valves are mounted so that the air control valves move in unison.

9. The apparatus of claim 8 which also comprises an air valve lever carried by the shaft, a throttle valve lever carried by the throttle valve and a link coupling together the air valve lever and throttle valve lever.

10. The apparatus of claim 9 wherein one of the air valve lever and the throttle valve lever includes a slot, and the link is slidably connected to said one of the air valve lever and the throttle valve lever through the slot providing a lost motion coupling between the air valve lever and throttle valve lever.

11. An apparatus for delivering a fuel and air mixture and air to an engine, comprising:
  a carburetor having a body, an air intake passage formed in the body through which a fuel and air mixture is delivered to the engine, and a throttle valve carried by the body for movement between idle and wide open positions to control fluid flow through the air intake passage;
  a passage member carried by the carburetor body and having at least one air passage through which air is delivered to the engine, and at least one air control valve carried by the passage member for movement between first and second positions to control the flow of air through said at least one air passage, the air control valve being operably connected to the throttle valve so that said at least one air control valve is moved between its first and second positions in response to at least a portion of the movement of the throttle valve between its idle and wide open positions;
  a fuel pump carried by the carburetor body on one side of the air intake passage;
  a pump cover plate carried by the carburetor body and defining at least part of the fuel pump of the carburetor; and
  the passage member is connected to the pump cover plate.

12. The apparatus of claim 4 wherein the throttle valve lever includes a plurality of holes each providing a separate location for connection of the link to the throttle valve lever.

* * * * *